(12) United States Patent
Li

(10) Patent No.: US 10,601,131 B2
(45) Date of Patent: Mar. 24, 2020

(54) BEAM STEERING AND MANIPULATING APPARATUS AND METHOD

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 134 days.

(21) Appl. No.: 15/477,118

(22) Filed: Apr. 3, 2017

(65) Prior Publication Data

US 2017/0205683 A1    Jul. 20, 2017

Related U.S. Application Data

(63) Continuation-in-part of application No. 13/310,701, filed on Dec. 2, 2011, now Pat. No. 9,660,339.

(51) Int. Cl.
| | |
|---|---|
| *H01Q 3/00* | (2006.01) |
| *H01Q 3/30* | (2006.01) |
| *H01Q 3/26* | (2006.01) |
| *G02F 1/29* | (2006.01) |
| *G02F 1/01* | (2006.01) |
| *H01Q 3/34* | (2006.01) |

(52) U.S. Cl.
CPC ............. *H01Q 3/30* (2013.01); *H01Q 3/26* (2013.01); *G02F 1/0102* (2013.01); *G02F 1/29* (2013.01); *G02F 1/293* (2013.01); *H01Q 3/34* (2013.01)

(58) Field of Classification Search
CPC ... H01Q 3/26; H01Q 3/30; H01Q 3/34; G02F 1/293; G02F 1/0102
USPC ........ 342/368, 372, 378, 380–384, 156, 424
See application file for complete search history.

(56) References Cited

U.S. PATENT DOCUMENTS

| | | | | |
|---|---|---|---|---|
| 3,806,931 A * | 4/1974 | Wright | .................. | H01Q 3/26 342/373 |
| 5,825,523 A * | 10/1998 | Amitai | ............... | G02B 26/0808 359/209.1 |
| 5,861,845 A * | 1/1999 | Lee | .......................... | H01Q 3/22 342/374 |
| 5,999,128 A * | 12/1999 | Stephens | ............... | H01Q 25/00 342/375 |
| 6,529,162 B2 * | 3/2003 | Newberg | ............. | H01Q 3/2682 342/372 |
| 6,690,326 B2 * | 2/2004 | Nemit | ..................... | H01Q 3/26 342/372 |
| 6,784,838 B2 * | 8/2004 | Howell | .................... | H01Q 3/26 342/377 |
| 6,856,284 B1 * | 2/2005 | Cangiani | ................ | H01Q 1/288 342/154 |
| 7,233,283 B2 * | 6/2007 | Kikuchi | ............... | H01Q 3/2605 342/372 |
| 8,344,945 B2 * | 1/2013 | Craig | .................... | H01Q 1/288 342/354 |
| 8,791,854 B2 * | 7/2014 | Forstner | .............. | H01Q 1/3233 342/154 |
| 9,225,396 B2 * | 12/2015 | Maltsev | ............. | H04W 52/267 |
| 10,027,354 B2 * | 7/2018 | Cohen | ................. | H01Q 21/293 |
| 10,243,412 B1 * | 3/2019 | Fink | ........................ | H02J 50/27 |
| 2010/0226134 A1 * | 9/2010 | Capasso | ................ | B82Y 20/00 362/311.02 |

(Continued)

*Primary Examiner* — Chuong P Nguyen

(57) ABSTRACT

An apparatus and method for electromagnetic beam steering and manipulating employ narrow beams in close proximity. The beam width and distance between neighboring beams are arranged around or smaller than the wavelength. In an aspect, a strong beam is steered by a much weaker beam. In another aspect, a strong beam is focused by a small group of much weaker beams.

20 Claims, 4 Drawing Sheets

(56) References Cited

U.S. PATENT DOCUMENTS

2011/0074646 A1* 3/2011 Snow ............... H01Q 1/50
  343/833
2013/0057432 A1* 3/2013 Rajagopal ............... H01Q 3/26
  342/368

* cited by examiner

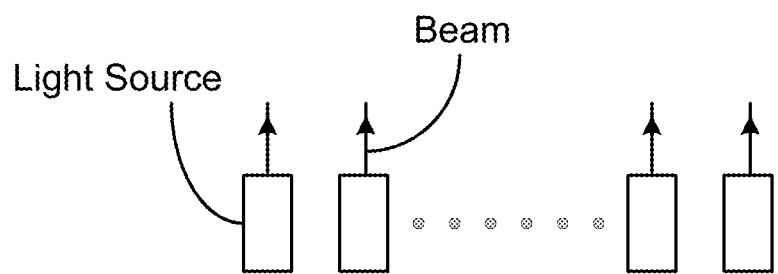
FIG. 1 (Prior Art)
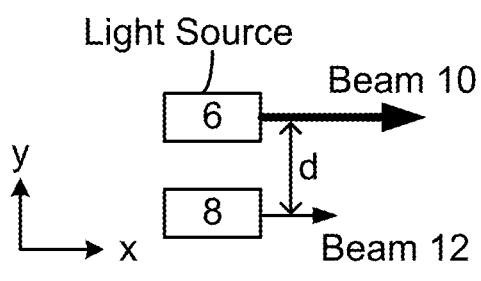
FIG. 2-A
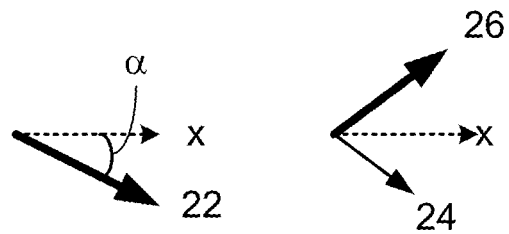
FIG. 2-B  FIG. 2-C
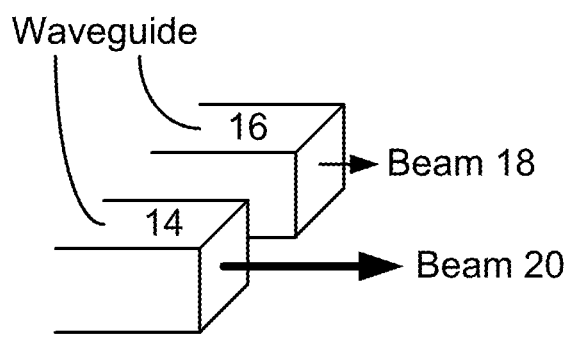
FIG. 3-A
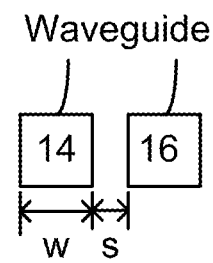
FIG. 3-B

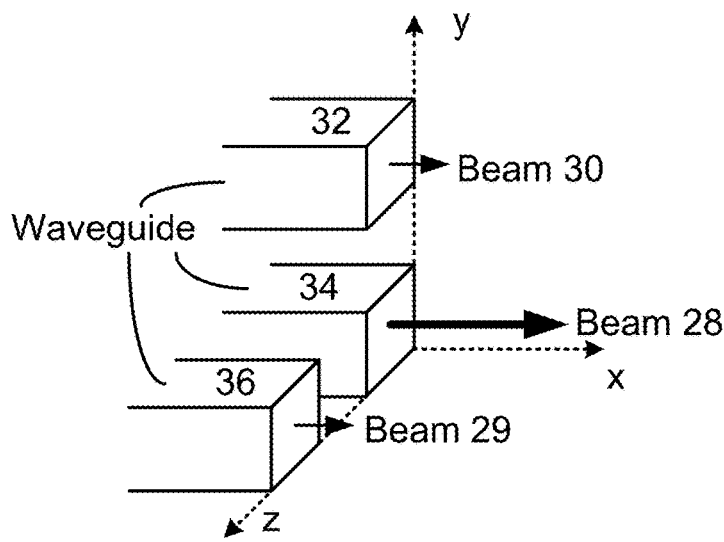
FIG. 4-A
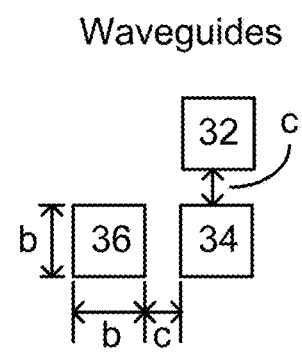
FIG. 4-B
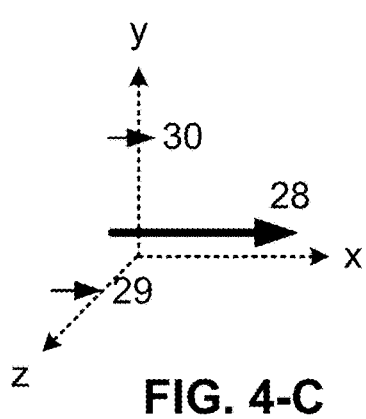
FIG. 4-C
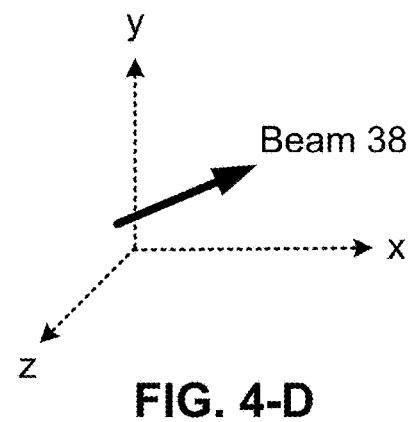
FIG. 4-D
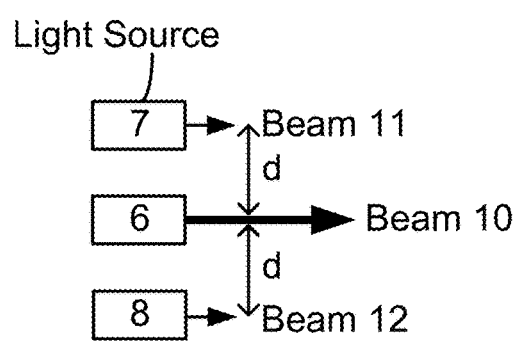
FIG. 5-A

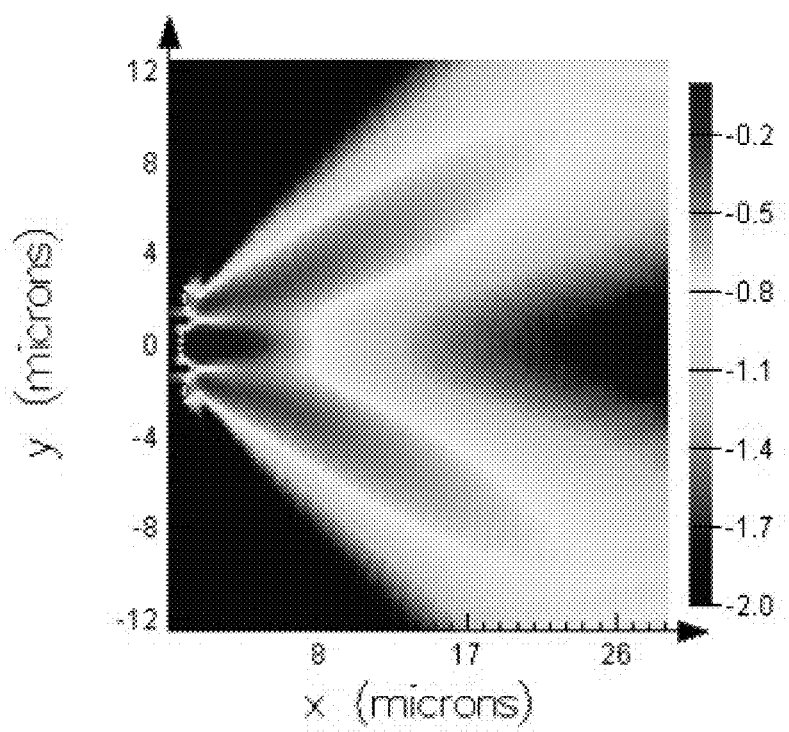
FIG. 5-B
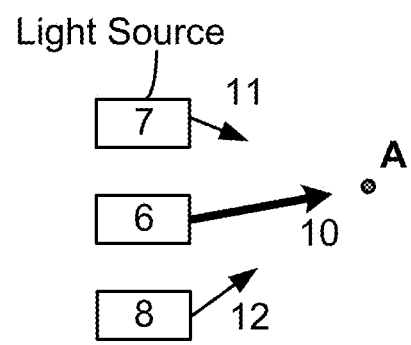
FIG. 5-C

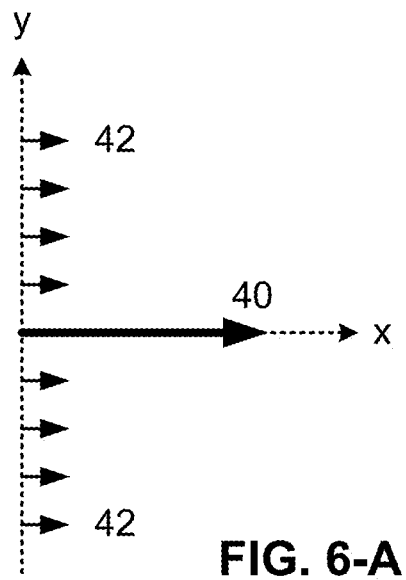
FIG. 6-A
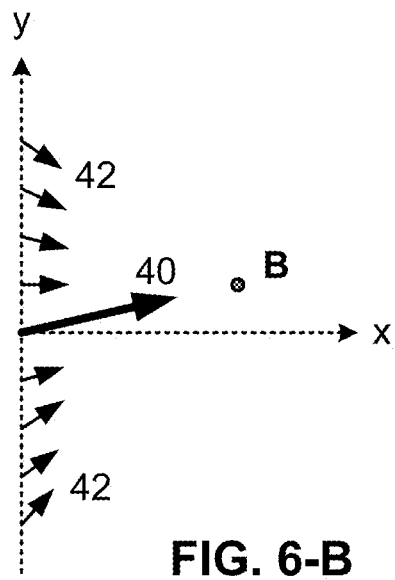
FIG. 6-B
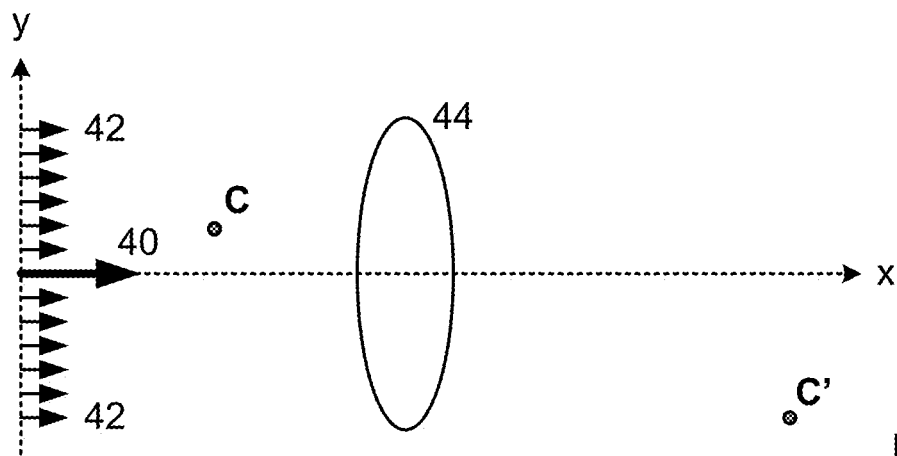
FIG. 7
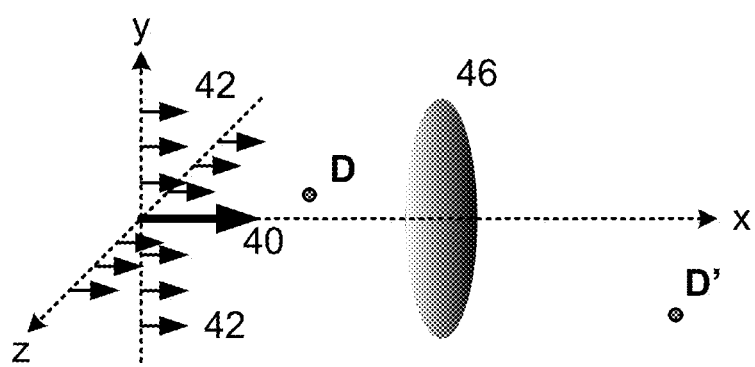
FIG. 8

BEAM STEERING AND MANIPULATING APPARATUS AND METHOD

CROSS REFERENCE TO RELATED APPLICATION

This is a continuation-in-part of U.S. patent application Ser. No. 13/310,701, filed Dec. 2, 2011.

FEDERALLY SPONSORED RESEARCH

Not applicable

SEQUENCE LISTING OR PROGRAM

Not applicable

BACKGROUND

Field of Invention

This invention relates to steering and manipulating electromagnetic beams, and particularly to steering and manipulating beams utilizing interferometric schemes.

Description of Prior Art

Electromagnetic beam steering has applications in free space optical communication, remote sensing, and compact projectors. Compared to conventional mechanical beam steering, nonmechanical beam steering has advantages of fast speed, compact structure, and potentially low cost. Current nonmechanical schemes include steering a collimated beam using phased array [P. F. McManamon, et al, "A Review of Phased Array Steering for Narrow-Band Electrooptical Systems", Proceedings of the IEEE, 97, 6, 1078 (2009)], and steering or shaping a divergent beam using plasmonics and phase manipulation [F. Capasso, et al, "Methods and Apparatus for Improving Collimation of Radiation Beams", U.S. Patent Application No. 20100226134, (2010), and D. C. Adams, et al, "Plasmonic mid-IR beam steering", Applied Physics Letter, 96, 201112, (2010)]. However, both nonmechanical methods involve a large number of beams having equal or moderate intensity, which usually means a complex structure and unnecessary power loss.

Therefore, there exists a need for beam steering scheme which requires less quantity of beams and lower beam intensity for the majority of beams involved in the process.

Beam as a term used here means any electromagnetic beam or electromagnetic wave which follows the Maxwell equations. Consequently, a beam may be of radiation in optical frequency range or radio frequency range, or in between, or beyond the two ranges.

Objects and Advantages

Accordingly, several main objects and advantages of the present invention are:

a). to provide an improved beam steering and manipulating device and method;
b). to provide such a device or method which utilizes less beams;
c). to provide such a device or method which utilizes beams of lower intensity; and
d). to provide such a device which is more compact and has smaller power loss.

Further objects and advantages will become apparent from a consideration of the drawings and ensuing description.

SUMMARY

In accordance with the present invention, a beam steering and manipulating apparatus utilizes one or more weak beams whose width is around or smaller than the wavelength to influence a strong beam whose width is also around or smaller than the wavelength. Intensity of the weak beam can be much lower than that of the strong beam. The beams are spaced apart by a distance around or smaller than the wavelength. Unlike a traditional phased array method, where a large number of beams are required for steering effect, the strong beam can be steered by only one weak beam. And a strong beam can also be focused by a small number of weak beams. Due to less beams involved, the apparatus structure is simpler and more compact. On the other hand, use of weak beams reduces power loss and also makes it easier to accommodate propagation loss associated in some cases, for example, when plasmonics is employed to generate beams.

DRAWING FIGURES

FIG. 1 shows a prior-art configuration of nonmechanical beam steering.

FIGS. 2-A to 2-C illustrate schematically an embodiment of beam steering and two examples of beam steering respectively.

FIGS. 3-A and 3-B show schematically another embodiment of beam steering in perspective and cross-sectional views.

FIGS. 4-A and 4-B depict schematically an embodiment of three-dimensional beam steering in perspective and cross-sectional views.

FIGS. 4-C and 4-D depict an example of three-dimensional beam steering.

FIGS. 5-A to 5-C shows schematically an embodiment of beam steering and manipulation.

FIGS. 6-A and 6-B illustrate schematically an embodiment of beam focusing.

FIG. 7 shows schematically another embodiment of beam manipulation.

FIG. 8 shows schematically an embodiment of beam manipulation in three-dimensional setting.

| REFERENCE NUMERALS IN DRAWINGS | |
|---|---|
| 6 Light source | 7 Light source |
| 8 Light source | 10 Beam |
| 11 Beam | 12 Beam |
| 14 Waveguide | 16 Waveguide |
| 18 Beam | 20 Beam |
| 22 Beam | 24 Beam |
| 26 Beam | 28 Beam |
| 29 Beam | 30 Beam |
| 32 Waveguide | 34 Waveguide |
| 36 Waveguide | 38 Beam |
| 40 Beam | 42 Beam |
| 44 Lens system | 46 Lens system |

DETAILED DESCRIPTION

FIG. 1—Prior-Art

FIG. 1 is a schematic view of a prior-art beam steering structure using phased array. The nonmechanical structure features a large number of radiation sources, which each produce an individual electromagnetic source beam. The source beams have the same or similar power level and are phase delayed respectively. Next, the source beams interfere among themselves and generate a resultant beam. The propagation direction of the resultant beam is determined by the phase of the individual source beams.

FIGS. 2-A to 2-C and 3-A and 3-B Embodiments of Beam Steering Apparatus and Method FIG. 2-A shows schematically a cross-sectional view of an embodiment of beam steering around one axis. Light sources 6 and 8 emit beams 10 and 12 along x-axis in x-y plane respectively. The beams are coherent. The width of the beams along y-axis is around or smaller than the wavelength of the beams. The spacing between the beams, represented by d in the figure along y-axis, is also around or smaller than the wavelength. "Around or smaller than the wavelength" as used herein may mean smaller than one and a half times of the wavelength. In addition, the power of beam 10 is at least twice that of beam 12. Initially, only beam 10 is turned on, it propagates along x-axis. Then, beam 12 is powered on, and beams 10 and 12 mix and interfere with each other. Beam 12 can be used to change the propagation direction of beam 10. Two possible results of combining beams 10 and 12 are shown schematically in FIGS. 2-B and 2-C. FIG. 2-B shows an exemplary case when beam 12 is 90 degree out of phase relative to beam 10. A resultant beam 22 is single and transmitted at an angle alpha relative to x-axis. In FIG. 2-C, beams 10 and 12 are arranged 180 degree out of phase. Then two beams 24 and 26 are generated, where the intensity of beam 26 is larger than that of beam 24.

It is noted that beam 12 has at most half the power of beam 10, but the former can be used to change the propagation characteristics of the resultant beam by adjusting phase relationship between beams 10 and 12. In other words, a weak beam can be employed as a control beam to influence a strong signal beam, and the resultant beam can work as an output beam. The signal beam may be used to control propagation of the resultant beam, or it may carry signals in a communication system and the output beam may be used as a result of signal processing. The output beam may also be used as a probe beam in remote sensing systems.

As a control beam, low power level is desirable for reducing system power consumption. A relatively weak control beam also cuts power loss of the corresponding resultant beam, as the resultant beam comes from interference between signal and control beams. In addition, a relatively weak control beam contributes to maintaining beam quality of the resultant beam, especially when a signal beam is much stronger than a control beam. Back to FIG. 2-A, finite difference time domain simulations show that beam 12 can manipulate a resultant beam with ten percent or even one percent of the power of beam 10.

FIGS. 3-A and 3-B are schematic perspective and cross-sectional view showing an embodiment using waveguides 14 and 16. The waveguides are designed for emitting beams 18 and 20 and have the width w and separation s between them, where both w and s are around or smaller than the wavelength of the beams. Because of waveguide setup, beams 18 and 20 have width and spacing which are either around or smaller than the wavelength. Again, beam 20 can have at least twice the power of the other beam, beam 18. And a resultant beam can be manipulated by changing the phase of the weaker beam 18.

FIGS. 4-A to 4-D Embodiment of Beam Steering Apparatus

Depicted in FIGS. 4-A to 4-D are drawings showing schematically an embodiment of two-axis beam steering or beam steering in three dimensions. In the figures, waveguides 32, 34, and 36 are positioned such that waveguides 32 and 34 are aligned along y-axis, while 34 and 36 are aligned along z-axis. The waveguides emit coherent beams 30, 28, and 29 respectively. The waveguides have a square-shaped cross section, whose width b and the spacing c between 32 and 34, or 36 and 34, are around or smaller than the wavelength of the beams. As a result, all three beams have the beam width that is around or smaller than the wavelength and their spacing along y or z axis is also around or smaller than the wavelength. Additionally, beam 28 serves as a signal beam, while beams 29 and 30 as control beams utilized for influencing propagation property of a resultant beam 38, as in FIG. 4-D. More specifically, beam 30 is used to control the angle of beam 38 around y axis, and beam 29 is used to control the angle around z axis. Thus beams 29 and 30 together can be used to steer beam 38 in three dimensions. As in the aforementioned two dimensional steering cases, the signal beam can have much higher power than the control beams. The power of beam 28 can be at least twice that of beams 29 and 30 combined, or ten times or even one hundred times of that of beam 29 or beam 30.

FIGS. 5-A to 5-C, 6-A, and 6-B Embodiment of Beam Steering and Manipulation

FIG. 5-A shows schematically a modification of the embodiment of FIG. 2-A in a two-dimensional example. Here a source 7 is added which emits a beam 11 along x axis, for providing two control beams for one-axis beam manipulation. Similar to the configuration of FIG. 2-A, beam 10 is the signal beam and beams 11 and 12 are the control beams. And the beam width and separation d between the beams are around or smaller than the wavelength. When beams 11 and 12 are 180 degree out of phase with beam 10, two resultant beams are generated, which are transmitted forward forming a plus and minus angle relative to the x-axis in the x-y plane. Again, beams 11 and 12, as control beams, can have much lower power level than that of beam 10.

FIG. 5-B shows two-dimensional simulation results using finite difference time domain method. Configuration of the simulation is similar to that of FIG. 5-A. There are one signal and two control beams, where the former is in between the latter beams. Beams are created by passing plane waves through narrow slits. The signal and control beams are arranged 180 degree out of phase. Wavelength is of 1.55 microns, beam width 0.5 micron, spacing between two beams 1.5 microns, and intensity of the signal beam is ten times that of each control beam. The figure depicts calculated field intensity distribution of Ey in log scale, where the weak control beams make a resultant beam split into two beams, as compared to a single resultant beam when the beams are in phase (not shown in the figure).

Furthermore, beams 10, 11, and 12 can be combined to form a converging beam; or in other words, beam 10 can be focused by beams 11 and 12, when three beams have a matching phase at a point, that is, the focal point. As illustrated in FIG. 5-C, when the phase of each beam is arranged such that they are in phase at a point A, the beams are focused on point A. In a conventional configuration, large quantities of beams which have similar intensity are employed to produce a focused beam. In comparison, only three beams are involved here for focusing in an extreme case. In FIG. 5-C, beam 10 can have much higher power than the other beams, similar to the beam steering examples discussed. It is noted that the focusing quality will degrade when the focus distance is much larger than the distance between control beams 11 and 12. For a larger focus length, more beams are used, as shown schematically in FIGS. 6-A and 6-B, where a beam 40 is of signal beam and beams 42 are of control beams. All beams have the beam width around or smaller than the wavelength and the spacing between neighboring beams is also around or smaller than the wavelength. And beam 40's power can be higher than the total power of beams 42. In FIG. 6-B, the beams are focused on a point B, indicating all beams are arranged in phase at point B. For beam manipulation in three dimensions, we can have two groups of control beams, which will be explained next.

FIGS. 7 and 8 Embodiment of Beam Manipulation

FIG. 7 shows schematically an embodiment of beam manipulation utilizing a lens system 44. Like the example of FIG. 6-A, there are a strong beam 40 and multiple relatively weak beams 42, and the beam width and beam spacing is around or smaller than the wavelength. Adjust the phase of beams 42 respectively such that all the beams are in phase at a point C. Consequently, all beams mix and interfere with each other to form a convergent resultant beam and are focused on point C on one side of lens system 44. Next, the convergent beam becomes a divergent beam and is processed by lens system 44. Lens system 44 then turns the divergent beam into a convergent and focuses it again on a point C' on the other side of lens system 44. Since adjusting the phase of beams 42 changes the position of point C, which in turn changes the position of C', beam 42 can be used to dispose point C' in a two dimensional space. Therefore, embodiment of FIG. 7 may be used for two dimensional steering, pointing, projection, communication, and sensing applications.

In FIG. 7 signal and control beams are positioned in one dimension and beam manipulation is carried out in two dimensions. For three-dimensional beam manipulation, another group of control beams in the third dimension is added as shown graphically in FIG. 8. This figure shows an embodiment where control beams are arranged along two directions, y and z axis. The total power of the control beams 42 can be smaller than the signal beam 40, and the control beams affect the propagation characteristics of the resultant beam. The resultant beam, as in FIG. 8, can be focused on a point D three-dimensionally. And point D in turn can be projected by a lens system 46 for creating an image point D'. The manipulation scheme finds use in similar applications to that discussed in above two-dimensional cases.

CONCLUSION, RAMIFICATIONS, AND SCOPE

Thus it can be seen that apparatus and methods are introduced to steer or manipulate a strong beam using one weak beam or a small number of weak beams.

The described embodiments have the following features and advantages:
(1). One or more weak beams are employed to steer or manipulate a strong beam;
(2). A smaller number of weak beams are employed to focus a strong beam;
(3). A simple and compact structure; and
(4). Increased power efficiency.

Although the description above contains many specificities, these should not be construed as limiting the scope of the invention but as merely providing illustrations of some of the presently preferred embodiments. Numerous modifications will be obvious to those skilled in the art.
Ramifications:

Besides providing a beam using waveguide, a beam can also be arranged by a small opening, a small or nano sized source.

The lens system can be a conventional bulk-optics lens system, or micro-optics lens system, or a beam manipulating system utilizing phase modulation or plasmonics.

Although around or smaller than the wavelength may mean smaller than one and a half times of the wavelength, in practice, beam width or beam spacing may be arranged smaller than the wavelength in some cases, or much smaller than the wavelength in some other cases. For instance, beam width is 0.5 micron while the wavelength is 1.55 microns for the example described in FIG. 5-B. In some applications, beam width or beam spacing may be arranged even smaller than one or two tenths of the wavelength.

Lastly, more or less beams can be used compared to the examples described in the figures. Thus the quantity of beams in aforementioned cases is exemplary and can be changed to other small numbers.

Therefore the scope of the invention should be determined by the appended claims and their legal equivalents, rather than by the examples given.

The invention claimed is:

1. A method for manipulating electromagnetic waves of a predetermined wavelength, comprising:
   1) generating a single first electromagnetic beam via a first emitting source of electromagnetic waves;
   2) generating a plurality of second electromagnetic beams via a plurality of second emitting sources of electromagnetic waves;
   3) adjusting phase of the plurality of second beams respectively using a phase delay controller
   4) the method arranged such that the first beam and the plurality of second beams each have beam width smaller than one and a half times of the predetermined wavelength along a predetermined first direction;
   5) the method arranged such that power of the first beam is at least twice power of at least two of the plurality of second beams; and
   6) mixing the first beam and the plurality of second beams to produce a third electromagnetic beam, wherein propagation characteristics of the third beam is influenced by the plurality of second beams.

2. The method according to claim 1, further including steering the third beam using the adjusting step in a two-dimensional or three-dimensional space.

3. The method according to claim 1, further including focusing the third beam at a place using the adjusting step.

4. The method according to claim 1, further including generating at least one fourth electromagnetic beam, wherein one of the at least one fourth beam is spaced apart from the first beam by a distance smaller than one and a half times of the predetermined wavelength along a predetermined second direction.

5. The method according to claim 1 wherein one of the first beam and the plurality of second beams is spaced apart from another of the first beam and the plurality of second beams by a distance smaller than one and a half times of the predetermined wavelength along the first direction.

6. The method according to claim 1, further including converting the third beam into a fifth electromagnetic beam.

7. The method according to claim 1 wherein the first emitting source includes a waveguide, a slit, a small opening, or a small sized generator.

8. A method for manipulating electromagnetic waves of a predetermined wavelength, comprising:

1) generating a single first electromagnetic beam via a first emitting source of electromagnetic waves;
2) generating a plurality of second electromagnetic beams via a plurality of second emitting sources of electromagnetic waves;
3) adjusting phase of the plurality of second beams respectively using a phase delay controller;
4) the method arranged such that the first beam and the plurality of second beams each have beam width smaller than one and a half times of the predetermined wavelength along a predetermined first direction;
5) the method arranged such that power of the first beam is larger than total power of the plurality of second beams; and
6) mixing the first beam and the plurality of second beams to produce a third electromagnetic beam, wherein propagation characteristics of the third beam is influenced by the plurality of second beams.

9. The method according to claim 8, further including generating at least one fourth electromagnetic beam, wherein one of the at least one fourth beam is spaced apart from the first beam by a distance smaller than one and a half times of the predetermined wavelength along a predetermined second direction.

10. The method according to claim 8 wherein one of the first beam and the plurality of second beams is spaced apart from another of the first beam and the plurality of second beams by a distance smaller than one and a half times of the predetermined wavelength along the first direction.

11. The method according to claim 8, further including focusing the third beam at a place by adjusting phase of the plurality of second beams respectively.

12. The method according to claim 8, further including converting the third beam into a fifth electromagnetic beam.

13. The method according to claim 8, further including steering the third beam in a two-dimensional or three-dimensional space.

14. The method according to claim 8 wherein the first emitting source includes a waveguide, a slit, a small opening, or a small sized generator.

15. An method for manipulating electromagnetic waves of a predetermined wavelength, comprising:
1) generating a single first electromagnetic beam via a first emitting source of electromagnetic waves;
2) generating at least one second electromagnetic beam and at least one third electromagnetic beam respectively via a plurality of second emitting sources of electromagnetic waves;
3) adjusting phase of the at least one second beam and the at least one third beam respectively using a phase delay controller;
4) the method arranged such that the first beam has beam width smaller than one and a half times of the predetermined wavelength along a predetermined first direction and along a predetermined second direction respectively, the first beam and one of the at least one second beam are spaced apart along the first direction, and the first beam and one of the at least one third beam are spaced along the second direction, wherein the first and second directions are different;
5) the method arranged such that power of the first beam is larger than total power of the second and third beams; and
6) mixing the first, second, and third beams with each other for producing a fourth electromagnetic beam, wherein propagation characteristics of the fourth beam is influenced by the second and third beams.

16. The method according to claim 15 wherein beam width of the second and third beams is smaller than one and a half times of the predetermined wavelength along the first and second directions respectively.

17. The method according to claim 15 wherein the first beam and one of the at least one second beam are spaced apart by a distance smaller than one and a half times of the predetermined wavelength along the first direction, and the first beam and one of the at least one third beam are spaced apart by a distance smaller than one and a half times of the predetermined wavelength along the second direction.

18. The method according to claim 15, further including steering the fourth beam in a three-dimensional space by the adjusting step.

19. The method according to claim 15, further including converting the fourth beam into a fifth electromagnetic beam.

20. The method according to claim 15 wherein the first emitting source and the plurality of second emitting sources include a waveguide, a slit, a small opening, or a small sized generator.

* * * * *